(12) United States Patent
Newell

(10) Patent No.: US 7,168,514 B2
(45) Date of Patent: Jan. 30, 2007

(54) MATERIALS HANDLING DEVICE AND SYSTEM

(76) Inventor: Gregory James Newell, 932 10th St., Unit 1, Santa Monica, CA (US) 90403

( * ) Notice: Subject to any disclaimer, the term of this patent is extended or adjusted under 35 U.S.C. 154(b) by 113 days.

(21) Appl. No.: 10/810,992

(22) Filed: Mar. 26, 2004

(65) Prior Publication Data
US 2004/0265148 A1 Dec. 30, 2004

Related U.S. Application Data

(63) Continuation-in-part of application No. 10/609,276, filed on Jun. 27, 2003, now abandoned.

(51) Int. Cl.
*B62D 51/04* (2006.01)
(52) U.S. Cl. .......................... 180/19.1; 180/15; 180/20
(58) Field of Classification Search ............... 180/19.1, 180/19.3, 11–13, 15, 16, 20, 904, 205, 206, 180/207; 206/703
See application file for complete search history.

(56) References Cited

U.S. PATENT DOCUMENTS

| | | | | |
|---|---|---|---|---|
| 2,949,972 | A | * 8/1960 | Wirkkala | .................... 180/19.1 |
| 3,662,911 | A | * 5/1972 | Harman | ...................... 414/430 |
| 3,854,164 | A | * 12/1974 | Schmitz | ...................... 15/340.2 |
| 3,876,024 | A | * 4/1975 | Shieman et al. | ........... 180/19.1 |
| 4,582,154 | A | 4/1986 | Englund | ...................... 180/74 |
| 6,148,944 | A | * 11/2000 | Adomi et al. | ............... 180/220 |

FOREIGN PATENT DOCUMENTS

| | | | |
|---|---|---|---|
| FR | 2604662 | * | 4/1988 |
| GB | 2229150 | * | 9/1990 |
| GB | 2248215 | * | 4/1992 |

OTHER PUBLICATIONS

IPC Automation Brochure—1 Page—The Micro II Digital 24-Volt PWM Scooter Controller,—undated.
Nustar PowerPusher Brochure—7 Pages—undated.
EasyMover Brochure—5 Pages—undated.
MasterMover UK Photographs—2 Pages—undated.
Electrodrive Brochure—4 Pages—undated.

* cited by examiner

*Primary Examiner*—Anne Marie Boehler
(74) *Attorney, Agent, or Firm*—John R. Flanagan

(57) ABSTRACT

A materials handling device includes a chassis, handle shaft pivotally mounted to the chassis for maneuvering the device, two rollers rotationally mounted to the chassis, battery pack supported on the handle shaft, electric motor and gearbox fitted in one roller in-line with a rotational axis thereof, and a controller supported on the chassis and having capacitors charged by the battery pack so as to have available when needed a store of electrical power. The controller is electrically connected between the battery pack and electric motor such that the store of electrical power can be supplied to the electric motor which, via the gearbox, can transmit a high torque driving output, when needed and instantaneously, to the one roller to thereby enable the device to move across a surface and to manipulate and move a heavy load.

26 Claims, 15 Drawing Sheets

MATERIALS HANDLING DEVICE AND SYSTEM

This application is a continuation-in-part of U.S. application Ser. No. 10/609,276, filed Jun. 27, 2003 now abandoned, by the inventor herein. The disclosure of said application is hereby incorporated herein by reference thereto.

TECHNICAL FIELD

The present invention generally relates to materials handling devices for manipulating heavy loads and, more particularly, is concerned with a materials handling device and system.

BACKGROUND ART

Compact materials handling devices are known that are operated by compressed air. Representative of these materials handling devices are the ones marketed under the brand name EasyMover. One version of the EasyMover device is disclosed in U.S. Pat. No. 4,582,154. A drawback of these compressed air powered devices is that they are required to be "tethered" in view that the compressed air needs to be fed to them typically through a $3/8$" to $1/2$" air line connected to a compressed air power source. These compressed air powered devices, nonetheless, do have certain advantages, which include: (1) they are very mobile and small in size yet can generate significant amounts of torque; (2) their compact size allows them to be fitted under most heavy rollable loads that require moving so that the weight of the load can provide the downward force on the driven wheel(s) of the power handling device to provide the traction required to move the load; and (3) they do not suffer any downtime in that the provided compressed air is always available and they are always connected to the compressed air so they can operate without interruption.

However, these compressed air powered devices also suffer from certain disadvantages, which include: (1) the requirement for compressed air limits use of these devices to locations and applications that have the required compressor available; (2) the requirement that the devices always be tethered by an air line can also severely restrict their use in many locations and applications; for example, if it is necessary to move a load over a long distance the air line becomes too cumbersome to manipulate, and for yard and/or outdoor applications the air line becomes unrealistic; (3) the volume of compressed air that can be supplied through an air line decreases as the length of the air line increases; accordingly, it is generally not feasible to operate the device through much more than 30 to 50 feet of air line, due to the reduced volume of air that can be supplied; and (4) to achieve their compact size these devices utilize a very compact, but very inefficient rotary vane style of pneumatic motor (having approximately 30% efficiency), that results in a very high consumption of compressed air. This high volume consumption precludes any possibility of moving the energy store to the unit itself (such as connecting refillable or quick-change compressed air cylinders to the device) as they would need to be very large to provide anything more than about a minute of continuous operation. In addition there is an unacceptable energy cost of operating at this level of inefficiency.

Alternatively, substantially less compact materials handling devices are available which are battery powered and thus are not tethered. Representative of these materials handling devices are the ones marketed under the brand names MasterMover, Nustar/PowerPusher and Electrodrive. Each of these devices have substantially similar designs that typically utilize an electric motor, a high reduction (typically worm style) gearbox and one or more 12-volt deep discharge sealed lead acid (SLA) batteries as their power source. While such battery powered devices have the benefit of being untethered, providing a greater degree of mobility and range of operation than the pneumatic powered devices, while still being capable of generating significant amounts of torque, they lose the key benefits of the pneumatic powered devices in that the battery powered devices: (1) are significantly larger and heavier than the pneumatic devices which reduces the ease of use, maneuverability, etc., of the battery powered devices; (2) in being significantly larger, typically are not locatable under the load being moved and so oftentimes require an auxiliary downward force or cumbersome geometry to provide the necessary downward force on the drive rollers (to provide the roller traction) to move the load; and (3) typically require downtime for recharging of the onboard batteries which can limit their functionality in high duty cycle applications.

Consequently, a need still exists for an innovative device which will avoid the aforementioned problems in the prior art with respect to pneumatic and battery powered high torque devices without introducing any new problems in place thereof.

DISCLOSURE OF INVENTION

The present invention provides components in a high torque materials handling device and system which satisfy the aforementioned need. The high torque materials handling device and system incorporating the components of the present invention avoid the problems of the prior art high torque pneumatic and battery powered devices yet, at the same time, still allows a user to move large and/or heavy loads (eg up to 50,000 kgs) while the device is untethered (ie not operating off an electrical power cord or compressed air line) but also substantially more compact than the aforementioned prior art battery powered devices.

Accordingly, the present invention is directed to a materials handling device which comprises: (a) a chassis; (b) an elongated handle shaft mounted to the chassis for use in maneuvering the device; (c) at least one roller rotationally mounted to the chassis and in contact with a surface; (d) at least one battery pack supported on the handle shaft and configured so as to substantially surround at least a portion of the handle shaft; (e) a drive unit spaced from the battery pack and mounted to the chassis so as to drivingly engage the roller; and (f) means for electrically connecting the battery pack to the driving unit to supply electrical power to operate the drive unit to transmit a high torque driving output to the roller so that a rotary driving output can then be supplied by the roller to enable the device to thereby move across the surface and manipulate and move a heavy load.

The present invention also is directed to a materials handling device which comprises: (a) a chassis; (b) at least one rechargeable battery pack removably and replaceably supported on the device; (c) an electric motor and gearbox in a driving relation with a roller in contact with a surface; and (d) a controller supported on the chassis and having a plurality of capacitors connected to the battery pack and charged by the battery pack so as to have available a store of electrical power, the capacitors of the controller being electrically connected between the battery pack and the electric motor such that the capacitors of the controller can supply the store of electrical power to the electric motor instantaneously when needed which via the gearbox can transmit a high torque driving output to the one roller so that a rotary driving output can then be supplied by the one roller to enable the device to thereby move across the surface and to manipulate and move a heavy load.

The present invention further is directed to a materials handling system which comprises: (a) a battery charger disposed at a location nearby an area of operation and operable to convert a rechargeable battery pack from a discharged condition to a charged condition; and (b) a materials handling device displaced from the battery charger and being operable for moving a load at the area of operation. The materials handling device includes (i) a drive unit provided on the device, (ii) a plurality of rechargeable battery packs, at least one of which being removably and replaceably provided on the device for supplying electrical power to operate the drive unit, at least another of which being provided at the location of the battery charger and maintained in a charged condition by the battery charger so that the another rechargeable battery pack is available to replace the at least one rechargeable battery pack on the device upon the at least one rechargeable battery pack on the device reaching the discharged condition, and (iii) a controller provided on the device and having a plurality of capacitors connected to the at least one rechargeable battery pack on the device, the capacitors being charged by the at least one rechargeable battery pack on the device so as to have available a store of electrical power, the capacitors also being electrically connected between the at least one rechargeable battery pack and the drive unit such that the capacitors can supply the store of electrical power to the drive unit instantaneously when needed such that the drive unit can transmit a high torque driving output to enable the device to thereby move across a surface and to manipulate and move the load.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

BEST MODE FOR CARRYING OUT THE INVENTION

Figure 1:
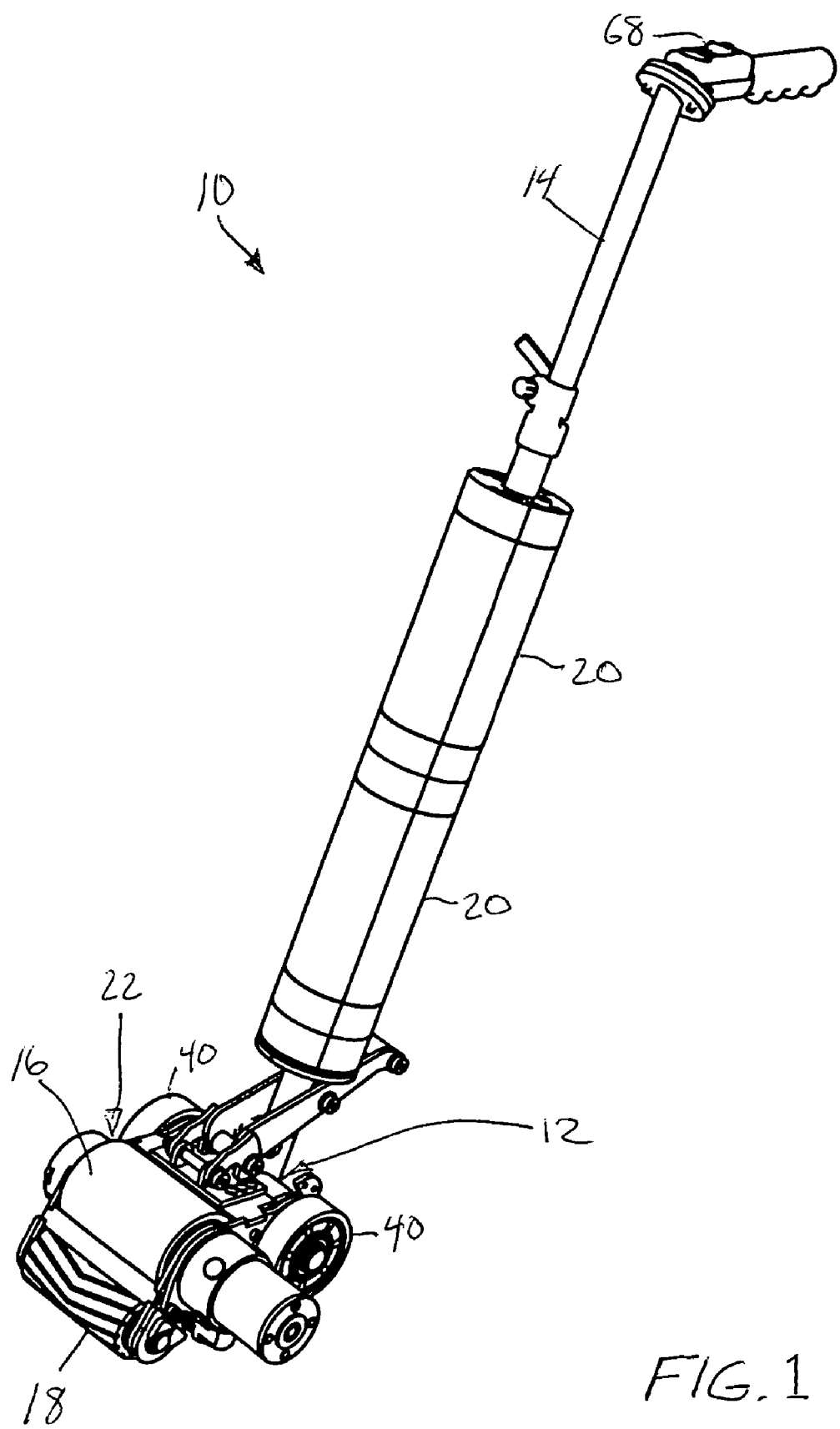
FIG. 1 is a perspective view of one embodiment of a materials handling device incorporating components of the present invention including a battery pack for powering the device being removably mounted in clam shell fashion about a handle shaft of the device which is disposed in an operational position.

Referring to the drawings, and particularly to FIGS. 1–8, there is illustrated one embodiment of a materials handling device, generally designated 10, which incorporates the components of the present invention. The device 10 includes a chassis 12, an elongated handle shaft 14 pivotally mounted at one end to the chassis 12 for use in maneuvering the device 10, at least one and preferably two rolling elements or rollers 16, 18 rotationally mounted to the chassis 12, at least one battery pack 20 supported on the handle shaft 14, and a battery powered drive unit 22 adapted to provide in-line driving of the one roller 16. The drive unit 22 includes an electric motor 24 and gearbox 26 fitted together in the one roller 16 in-line with the axis A of the one roller 16, and a controller 28 supported on the chassis 12 below the one roller 16. The controller 28 has a plurality of capacitors 30 connected to the battery pack 20 and adapted for charging by the battery pack 20 so as to have available a store of electrical power, when needed.

Figure 8:
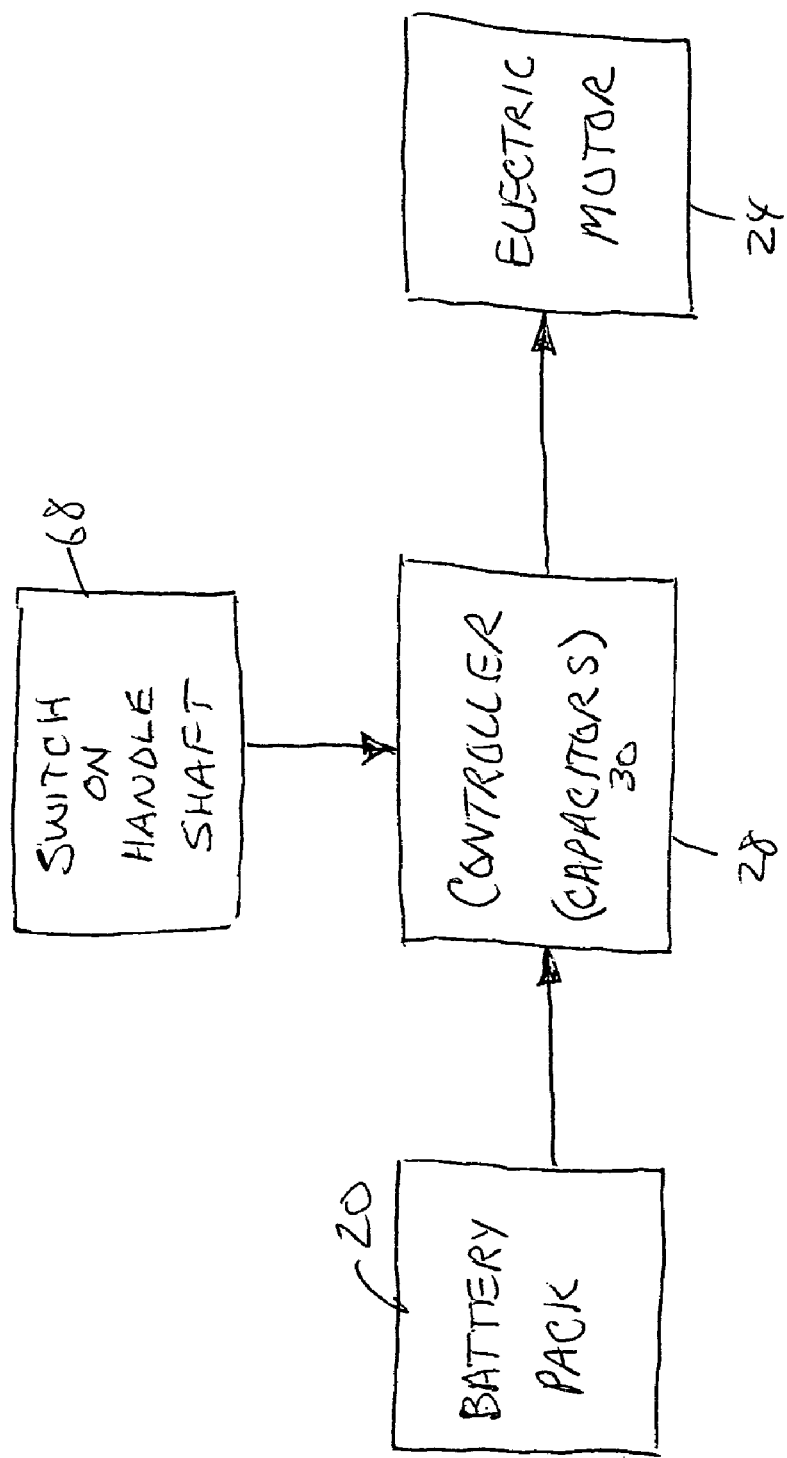
FIG. 8 is a general block diagram of the electrical components of the device.

As seen diagrammatically in FIG. 8, the capacitors 30 of the controller 28 are electrically connected between the battery pack 20 and the electric motor 24 such that the capacitors 30 can supply the store of electrical power to the electric motor 24 which via the gearbox 26 can transmit a high torque driving output, when needed, instantaneously to the one roller 16 so that a rotary driving output can then be supplied by the one roller 16 to the other roller 18 to enable the device 10 to thereby move across a surface and to manipulate and move a heavy load. The device 10 achieves a high level of performance while retaining the benefits of compactness, versatility, reconfigurability and modularity as provided by the pneumatic powered materials handling device developed by the same inventor herein which device is disclosed in above-cited pending application Ser. No. 10/609,276.

Further, the chassis 12 of the device 10 has opposite sideplates 32, 34 being structurally interconnected by two or more cross members 36, 38. The device 10 also has a pair of rear wheels 40 which rotatably support the rear portion of the chassis 12 where the handle shaft 14 is pivotally connected to the chassis 12. Thus, in the configuration of the device 10 shown in FIGS. 1–4, the wheel 18 is disposed at the front of the chassis 12 and the drive wheel 16 is disposed above and between the front wheel 18 and the rear wheels 40. The chassis 12 further includes a cylindrical support 42 mounted to one sideplate 32 and an end cap 44 mounted to the other sideplate 34. The drive roller 16 is a cylindrical body which is disposed over and supported by the cylindrical support 42 and is rotatably supported at its opposite ends by journal bearings 46, 47. The electric motor 24 and gearbox 26 are disposed inside the cylindrical support 42 as well as inside the drive roller 16 and aligned in-line with one another and the axis A of the drive roller 16. These components which makeup the drive unit 20 of the device 10 are disposed between the end cap 44 and another larger end cap 48 which houses the one journal bearing 47. The gearbox 26 is drivingly coupled to an output shaft (not shown) of the motor 24 and, in turn, is drivingly coupled to a shaft 50 connected to one end of the cylindrical support 42 and drive roller 16 for transferring the torque of the motor 24 to the drive roller 16. An outer end of the shaft 50 is rotatably supported by another journal bearing 51 housed by an extension 48A of the larger end cap 48.

Before proceeding further into a detailed description of the materials handling device 10 and in order for one to gain a more thorough understanding and appreciation of its unique combination of components of the present invention incorporated by the device 10, it would first be helpful to explain the fundamentals of conventional battery power used in prior materials handling devices as well as other prior devices. Prior battery powered devices exist that are capable of generating a significant amount of torque (eg to move up to 50,000 kgs or more). These prior devices typically make use of 6 or 12-volt Sealed Lead Acid (SLA) rechargeable batteries, such as "deep discharge" versions, sometimes referenced as "FK" series (12V for forklift applications) or "GC" series (6V for golf cart applications) and are capable of discharging as much as 80–90% of their maximum storage capacity. The reasons this battery technology is typically utilized are the following:

(1) Considering the massive amount of amp-hours they can store and discharge, they offer a very attractive price/performance, while also being widely available.
(2) These SLA batteries, although relatively large and heavy, have a significant storage capacity. For example, a 12-volt FK battery such as the Surrette S-460 (L-16) has an amp-hour rating of 282 amp-hrs (based on an 8 hour discharge) which at 80–90% discharge equates to as much as 250 available amp-hrs.
(3) SLA batteries are able to peak discharge amps at a very high level (ie for a brief period of time). If the duration continues too long however, the battery is adversely affected and the maximum number of cycles the battery can achieve will be reduced. Typically applications that require moving of massive loads only require such peak discharge for a very short time (eg such as to overcome the stationary inertia or to raise a mass up onto a raised platform, trolley, etc.).
(4) These batteries can be regularly recharged and are especially suited to "topping up", ie not fully discharging the batteries but regularly recharging them to maintain a near fully charged status. As such, if "docked" to be recharged between uses, such batteries can provide "always available" operation.

However, SLA batteries, as with all known battery technologies, suffer from their own peculiar and inherent disadvantages, which include the following:

(1) Their physical size and weight are significant, particularly for "deep discharge" batteries that are made with lead-antimony plates as much as ¼" thick. While smaller sizes of SLA batteries may be available, for them to allow "deep discharge" use, they tend to have a significant mass. Both the size and weight of this battery technology is of course counter to the objective of providing a small and maneuverable device.
(2) Due to the limitations of SLA technology, their form factor is typically a rectangular prism, which severely limits the design options in configuring a small/agile device that an operator can easily maneuver and/or fit into small spaces.
(3) A characteristic of SLA technology is that the total number of battery cycles they are capable of is compromised the more they are discharged between charges. In fact if they are fully discharged (ie "run-to-flat") then they can be irreversibly damaged and it is not uncommon that in the applications they are used, this commonly occurs. (A commonly cited reason for accepting the compromise of pneumatic devices is that battery units frequently end up flat and therefore inoperable until new batteries are installed.)
(4) SLA technology does not lend itself to high voltage cells, as each chamber can generate only 2–3 volts, and the surface area and thickness of the plates play a significant role in the charge/discharge performance. So to achieve a higher volume, multiple batteries are typically required, which increases the total size and mass of the system. As a result, such devices are typically 12-volt (same approximate form factor as one car battery or two car batteries in parallel) or 24-volt (same approximate form factor as one or two sets of two car batteries in series).

To achieve a compact battery based materials handling device still capable of outputting similar high levels of torque like the pneumatic based device of the above-cited patent application and thus to achieve a materials handling device substantially smaller than prior battery based materials handling devices, every aspect of a conventional battery-based machine had to be rethought by the inventor herein and many elements conceived and combined in a quite unique and counter-intuitive manner. The battery pack 20 and its configuration, the electric motor 24, the gearbox 26, and the controller 28 interrelate with one another and must cooperate together in order to provide the desired compactness and performance of the materials handling device 10.

Now will be described in detail the unique choice and selection of components of the present invention used in the materials handling device 10, and how they have been combined to create the materials handling device 10 that can provide a performance that seems entirely inconsistent with its very compact size.

Battery Packs

If one is setting out to design a materials handling device capable of moving significant loads, it is logical to consider a battery pack combination that provides both high max-amp draw, and also a large storage capacity (as the high current draw required for a high load application can very rapidly deplete the available store). In this respect, the SLA batteries that are typically used are the only logical choice as they rate significantly higher in both of these respects than other technologies. To illustrate this, the aforementioned FK-Series SLA is a 12-volt battery rated at 282 amp-hrs (assuming constant draw over 8 hrs), while the 48-volt battery pack 20 that is actually utilized in the materials handling device 10 has a total capacity of only 4.5 amp-hrs. Yet due to the way the battery pack 20 is used and the other components involved (the electric motor 24, gearbox 26, controller 28, etc), the 48-volt battery pack 20 is still capable of providing a comparable functionality to the aforementioned 12-volt battery.

Figure 9:
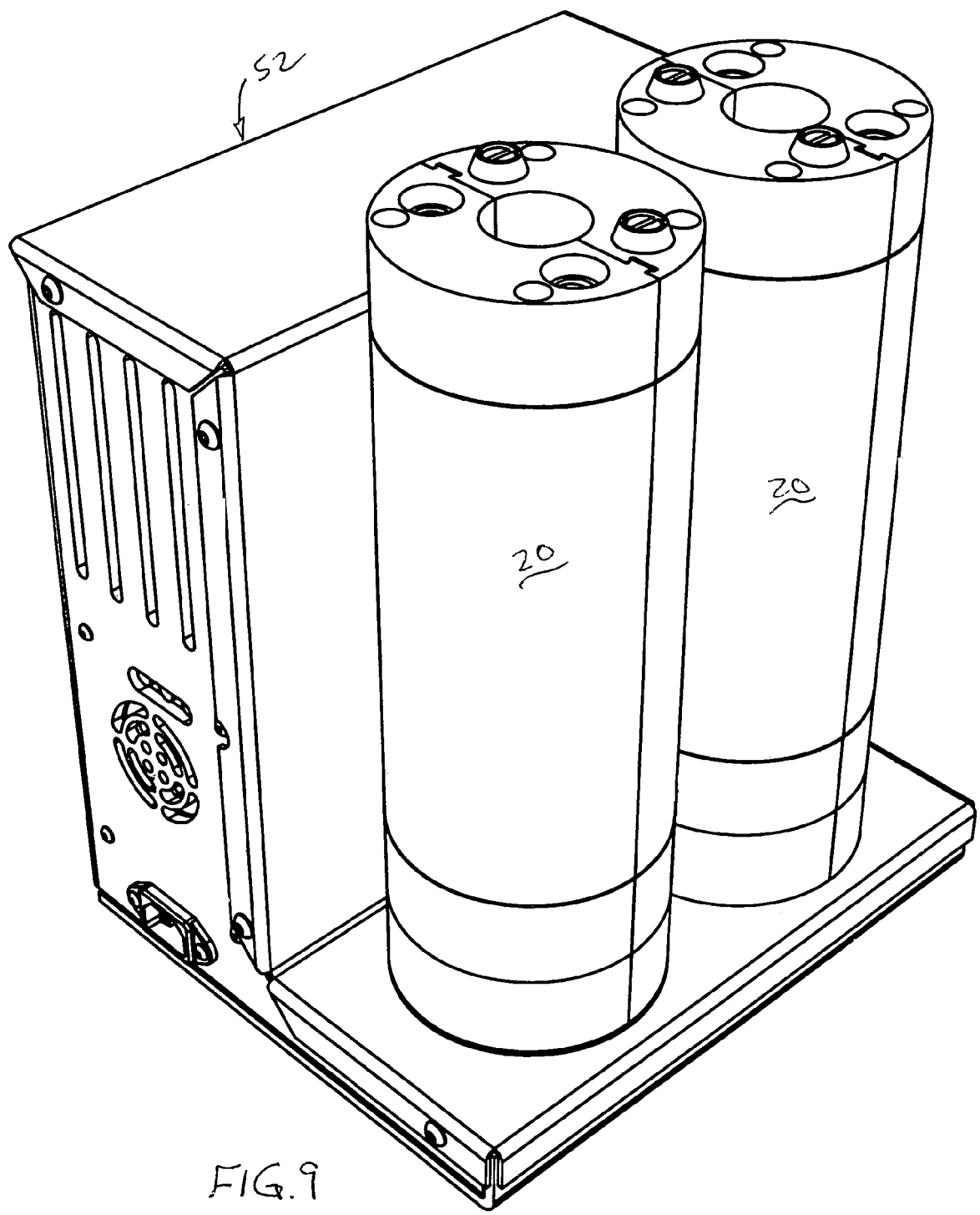
FIG. 9 is a perspective view of a battery charger for use in off-machine recharging of the battery packs.

To explain the dramatically different approach to the provision of the battery pack 20 utilized by the present invention, it is necessary to explain one of the initial premises that this invention relies on, which is believed to be unique for such an application. The principle adopted in the present invention was that instead of loading the device 10 down with a large capacity battery and charging it "on-device", a significantly smaller battery pack can be utilized that once it is discharged, can be very quickly and easily switched out and replaced by another pre-charged battery pack. So one (or more) of the same interchangeable battery packs 20 can be sitting on an "off-device" rapid charger 52, as seen in FIG. 9, at a nearby location ready for use at any time. The resulting benefits are (i) substantially less battery bulk being carried around on the actual device 10, (ii) no device down-time for recharging, and (iii) no possibility of being caught with the device 10 being non-commissionable due to a battery becoming depleted during use. Furthermore, it should be understood that the application of the foregoing principle is not limited to the device 10 but, instead, is equally applicable to, and equally novel in its application to, other types of materials handling devices.

While the "technology" of SLA batteries alone does not preclude it from being able to comply with this compact and quick-change battery concept, the typically rectangular-prism proportions of all available deep cycle SLA batteries precluded them from physically meeting the requirements. (It should be noted, however, that a custom designed and built SLA battery may possible allow compliance with the invention's requirements and therefore be able to be used a future time). So for the present time, with the SLA battery option excluded, the approach chosen by the inventor herein was to build custom battery packs 20 from cylindrical battery cells 54, such as (sub-C) NiCad batteries, although NiMH or Lithium batteries could also have been used. The reasons this approach was chosen are as follows:

(1) SLA batteries are typically 6 or 12-volt packs, and so to get more than 12 volts power supply (the benefits of higher voltage operation will be explained in the "motor" section below), two, three, four or more SLA batteries would be required which would result in a considerable volume and weight in on-machine battery design. As a result, most (relatively) compact conventional battery powered devices operate on 12 or 24 volts at most. In contrast, the cylindrical battery cells 54 employed in the battery packs 20 designed by the inventor herein can operate at 48 volts (or could optionally be configured so that two packs can be installed in series, rather than parallel, to discharge at 96 volts).

Figure 5:
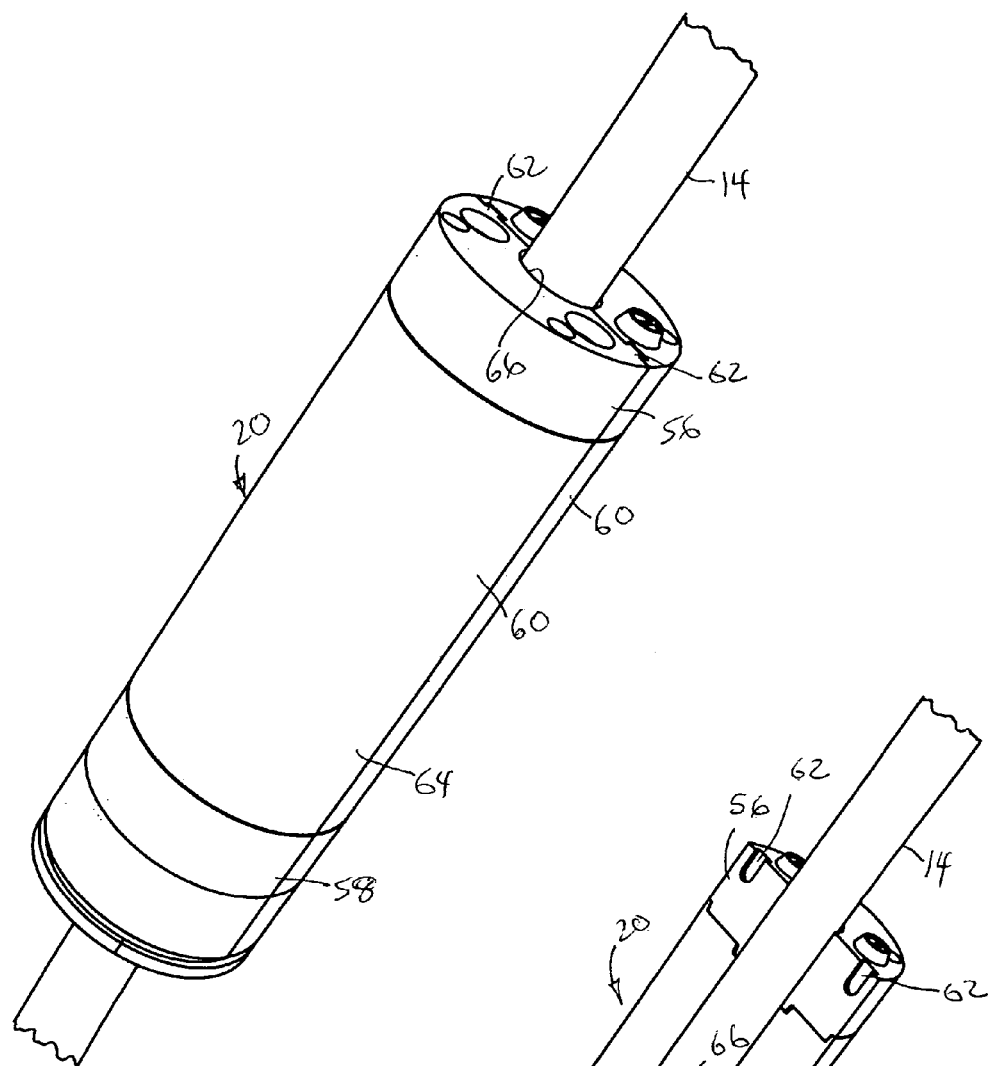
FIG. 5 is an enlarged fragmentary perspective view of the device of FIG. 1 showing the battery pack disposed about the handle shaft of the device.
Figure 6:
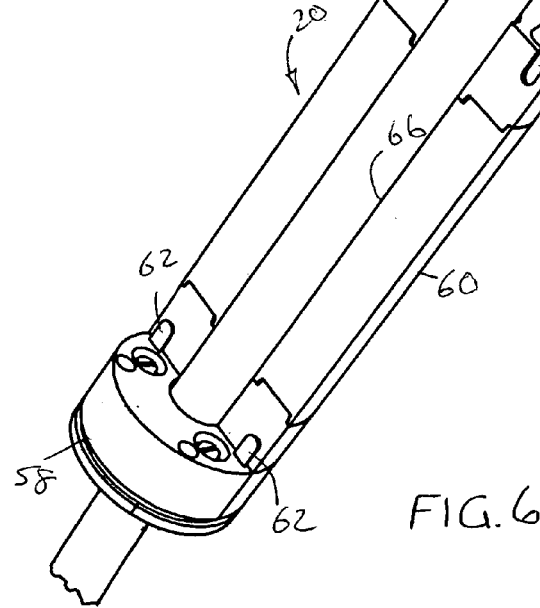
FIG. 6 is another perspective view similar to that of FIG. 5 now showing one half of the battery pack.
Figure 7:
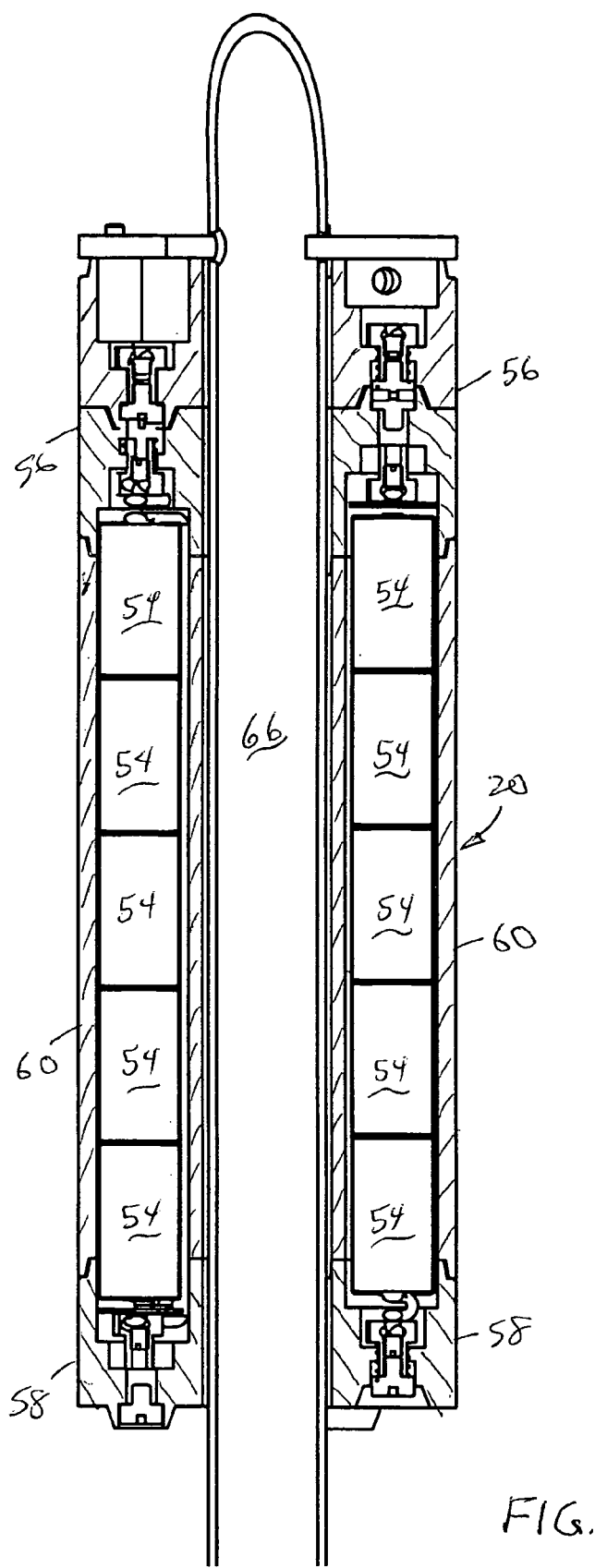
FIG. 7 is an enlarged fragmentary lengthwise sectional view of the battery pack of the device.

(2) Battery packs 20 would be assembled from small, 1.2-volt, cylindrical battery cells 54, which allows for a plethora of possible form factors to be created beyond the conventional rectangular prism shapes of SLA batteries. This is extremely advantageous in respect to the perceived size of the materials handling device 10, as it allows the battery packs 20 to be moved off the device 10 itself and into/around the handle shaft 14 (see FIGS. 5 and 6) and in respect to creating a shape that is easy to grip, remove and handle with one hand. As seen in FIGS. 5–7 and with particular reference to FIG. 7, the cylindrical battery cells 54 are supported end-to-end in a plurality of stacks spaced apart from one another about the handle shaft 14 and between upper and lower electrical contacts 56, 58 within in containers or holders 60 of semi-cylindrical configuration that fit and fasten together at 62. The holders 60 when fitted together provide a housing 64 having an annular configuration forming a passage 66 therethrough for accommodating the handle shaft 14 of the device 10 such that the battery packs 20 surround the handle shaft 14 and thereby take up space which is not otherwise being utilized and which does not affect the profile or envelope of the chassis 12 and rolling elements of the device 10. It is thus seen that the battery packs 20 have been designed to be easily accessible and able to be removed and replaced easily, with one hand, in just a few seconds.

(3) These battery packs 20 have been designed to be able to be "stacked" up the handle shaft 14 of the device 10, which allows flexibility in tailoring the device 10 (selecting the number of battery packs 20) to suit the application. For example, where extreme compactness or maneuverability of the device 10 is a priority, one battery pack 20 can be used, and when higher torque or a longer duty cycle is a priority, an additional battery pack 20, or even two additional battery packs 20 can be stacked up the handle shaft 14.

(4) The battery packs 20 are suited to being completely discharged before being recharged. Also the battery packs 20 are well-suited to rapid charging.

(5) The battery packs 20 can supply a relatively high, short-duration peak current draw without suffering damage (design specification for the specified battery cells 54 is 250 amps peak discharge, which for two battery packs 20 equates to 500 amps of draw, however measured tests conducted by the inventor indicate 120 amps for one pack, and therefore 240 amps for two packs in parallel).

It should be pointed out that the handle shaft 14 and battery pack 20 could be provided in a common or unitary structure such that the entire handle shaft (with integral battery pack) would be disconnected and switched-out with another.

Figure 10:
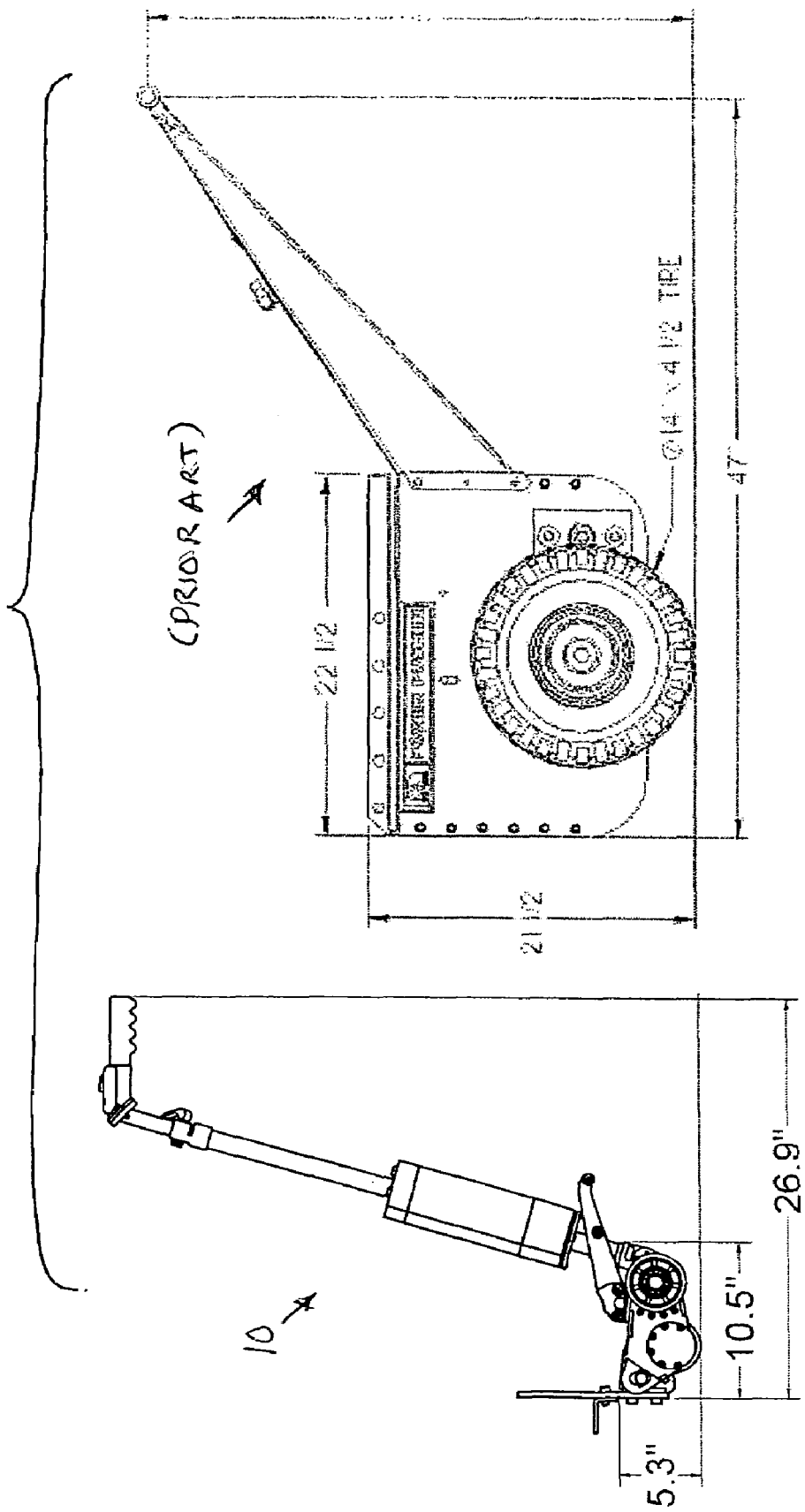
FIG. 10 is a side elevational view of a materials handling device incorporating the components of the present invention and a prior art materials handling device known by the brand name Nustar/PowerPusher, view highlights the significant reduction in size of the device brought about by the components of the present invention.
Figure 11:
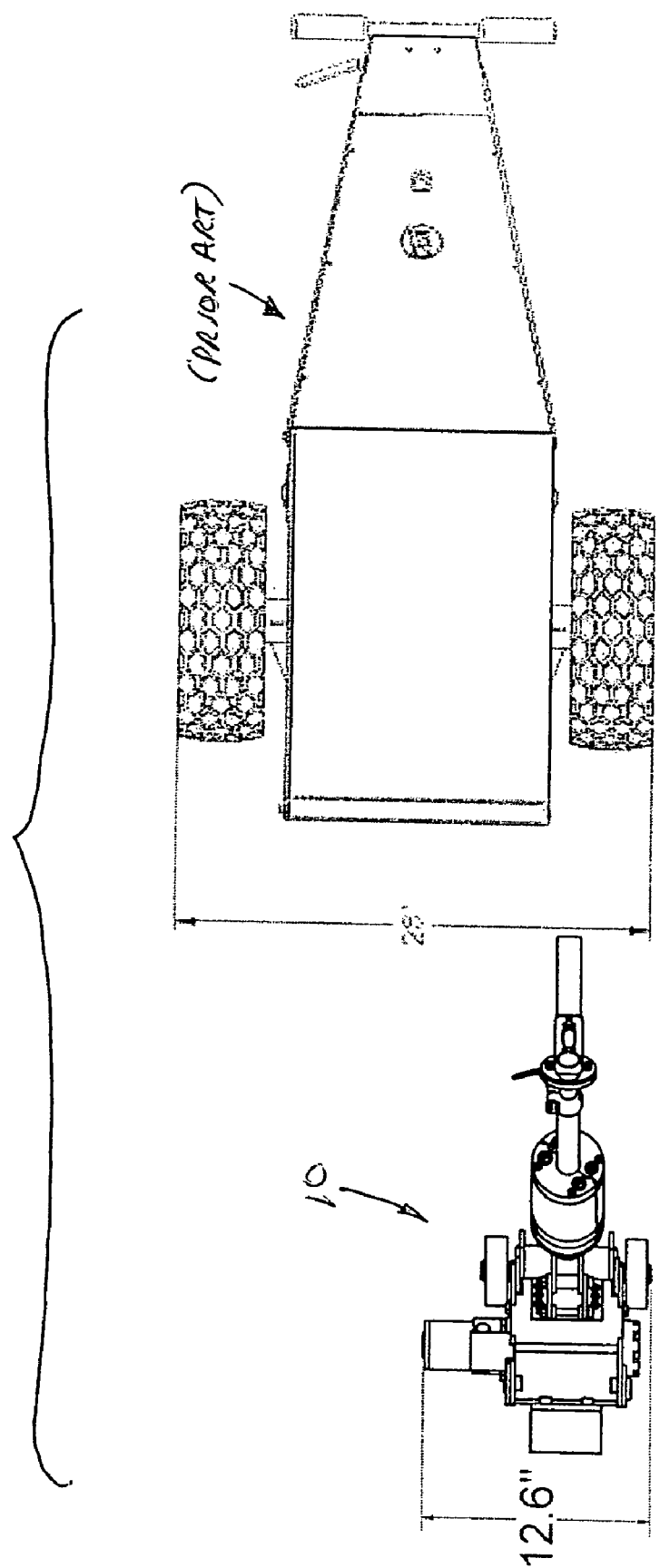
FIG. 11 is a top plan view of the devices of FIG. 10.

FIGS. 10 and 11 provide a dramatic visual comparison of the size or volume of the materials handling device 10, incorporating the components of the present invention which include the battery packs 20, with one prior art materials handling device which is known by the brand name, Nustar/PowerPusher. The device 10 (excluding handle) has the following dimensions and resulting volume: 10.5"L× 12.6"W×5.3"H=700 cubic inches. The PowerPusher device (exclusing handle) has the following dimensions and resulting volume: 22.5"L×28"W×21.5"H=13,545 cubic inches. Even though the device 10 is approximately 1/20th the size, and therefore infinitely easier to maneuver around than the prior art alternative, the device 10 is still significantly more powerful.

Electric Motor

For the intended application (an extremely compact device 10 capable of moving substantial loads), the electric motor 24 needs to be very small, while also being capable of outputting a significant amount of torque, while still being extremely compact and energy efficient. The best way to achieve this (which was another factor leading to the above-described battery technology) is to run higher voltages than the normal 12 or 24 volts. There are two main benefits of running a higher voltage. They are:

(1) The first is related to the version of Ohm's Law, P=IV, or Power (watts)=Voltage (volts)×Current (amps). So for a given power output, doubling the voltage halves the amount of current required. The advantage is that it is the current that determines the gauge of wire required, which is a major determinant of the size of the electric motor. So for a given electric motor to generate a given power, it is the length of wire wrapped around the poles of the armature that is significant. So if the amperage is higher (due to a lower voltage), not only does the diameter of the wire going to the electric motor have to increase, but the diameter of the wire in the electric motor also has to be increased, which affects the length and diameter of the motor.

(2) The efficiency of an electric motor is increased with a higher voltage. Again, using a variation on Ohm's Law, $P=I^2R$, or Power (watts)=Current$^2$(amps$^2$)×Resistance (Ohms). What is significant here is that the higher current of a lower voltage electric motor means (for the same Power) an exponentially higher resistance, which is reducing efficiency. For an electric motor to run most efficiently, the ideal is to run a high voltage (which, in turn, results in a high rpm) and a low amperage.

So for the electric motor 24 that is required to generate 1.2 kW of Power (which is approximately the power desired for the materials handling device 10, capable of moving up to 50 tons on the flat), the following Table I setting forth the relationships of Voltage, Current, Wire Gauge Wire Diameter to Motor Volume indicates that a custom designed high torque permanent magnet DC (PMDC) electric motor that operates very efficiently at 48 volts has the desired size (motor volume) for the intended application.

TABLE I

| Voltage (Volts) | Current (Amps) | Wire Gauge | Wire Diam | Approx Diam × Lgth = Motor Volume |
|---|---|---|---|---|
| 6 | 200 | #1 | 7.4 mm | 7.00" × 8.0" = 56"$^2$ |
| 12 | 100 | #6 | 4.1 mm | 5.75" × 7.0" = 40"$^2$ |
| 24 | 50 | #10 | 2.6 mm | 4.50" × 6.0" = 27"$^2$ |
| 36 | 33 | #13 | 1.8 mm | 3.25" × 5.2" = 17"$^2$ |
| 48 | 25 | #15 | 1.5 mm | 2.75" × 4.4" = 12"$^2$ |

Despite its extremely compact size (2¾" diam×4.4" lgth) this electric motor 24 is capable of generating 1.2 kW of power, which is approximately the same as the electric motors of the aforementioned much larger SLA battery operated devices, or the previously referenced pneumatic devices.

However, while this is the normal amount of power required to move massive loads, there are typically "PEAK" requirements, eg overcoming the inertia of a heavy load, rolling over imperfections on the floor, etc. So it is necessary that a higher power or, in this case, torque be supplied "instantaneously". In this case, the high torque 48V electric motor 24 custom designed and manufactured for this application is capable of taking up to 480 amps (short duration).

In addition, the battery packs 20 previously described are capable of supplying said amps, and further, another feature of the device 10 of the present invention is the interface between the battery pack 20 and the electric motor 24, such being the controller 28 which takes the input from a speed/direction switch 68, as seen in FIGS. 1 and 8, on the handle shaft 14 which is activated by the operator of the device 10. The controller 28 will now be described.

Controller

Figure 2:
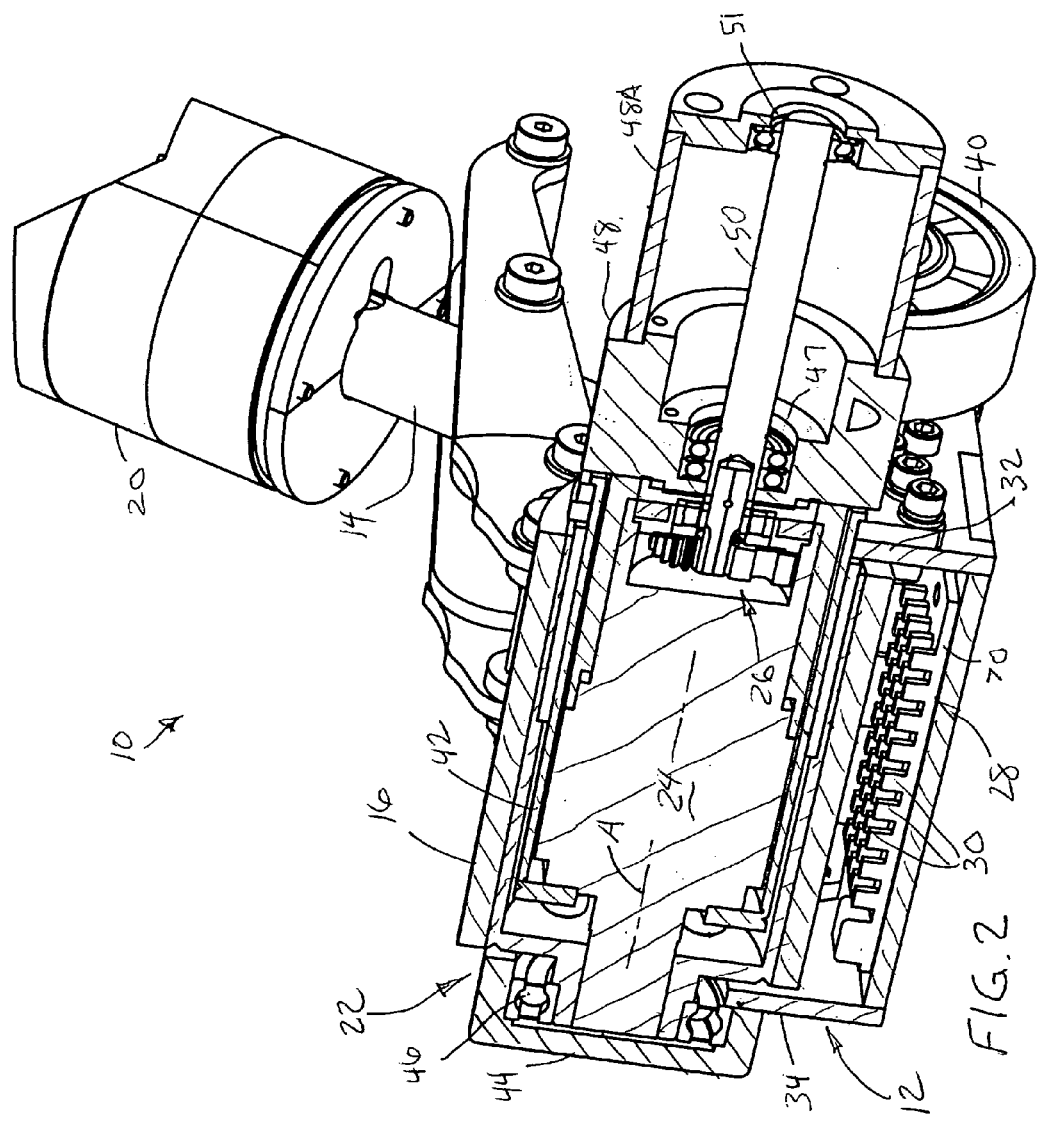
FIG. 2 is an enlarged fragmentary perspective view of the device of FIG. 1 with portions of the device cutaway and longitudinally sectioned to show a driving unit of the device in the form of an electric motor and gearbox mounted in one of the rollers of the device.
Figure 3:
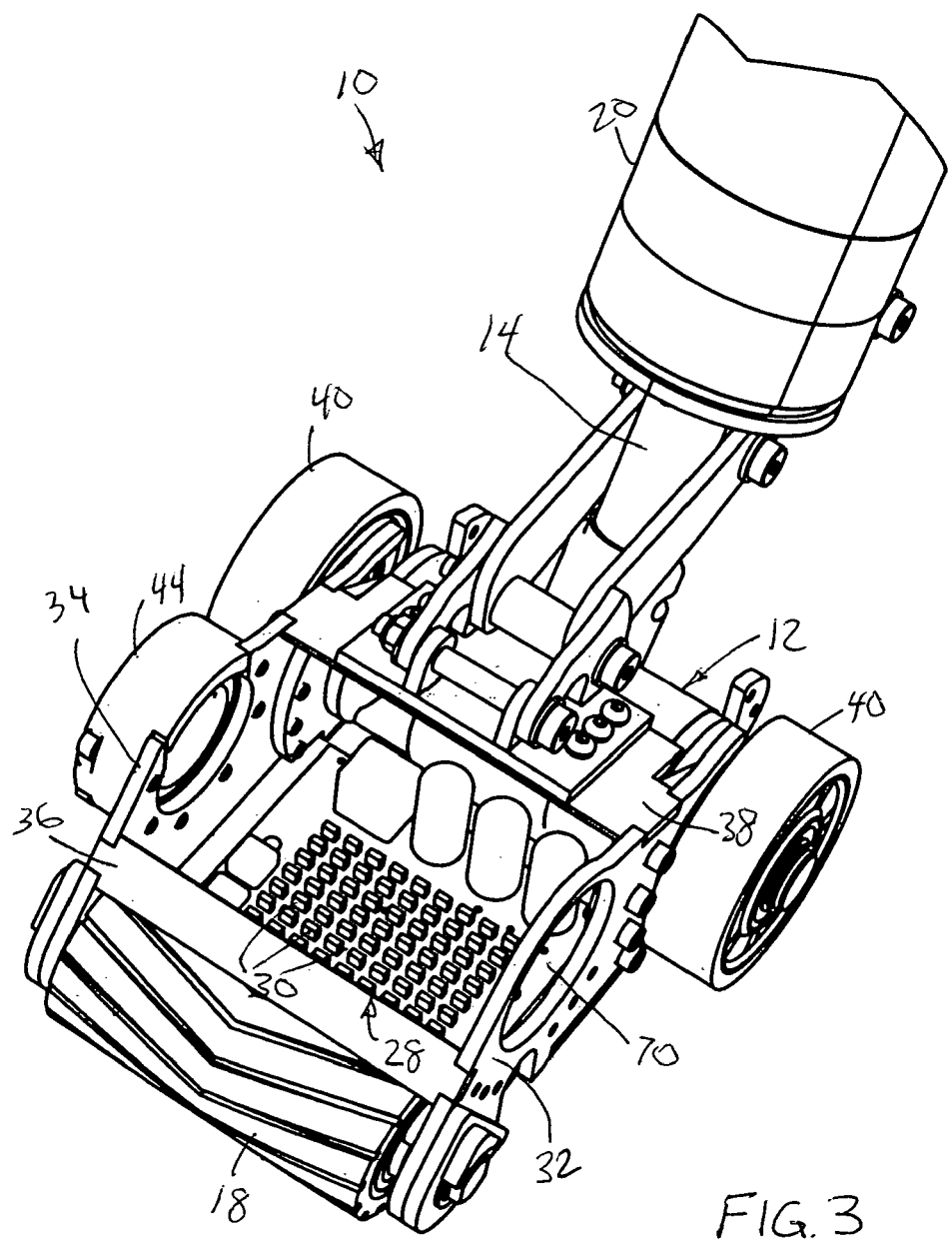
FIG. 3 is an enlarged fragmentary perspective view of the device of FIG. 1 with the driving unit seen in FIG. 2 now removed to expose below it the location of a plurality of electrical capacitors of a controller that are charged by the battery pack so as to provide instantaneous electrical power when needed by the electric motor.
Figure 4:
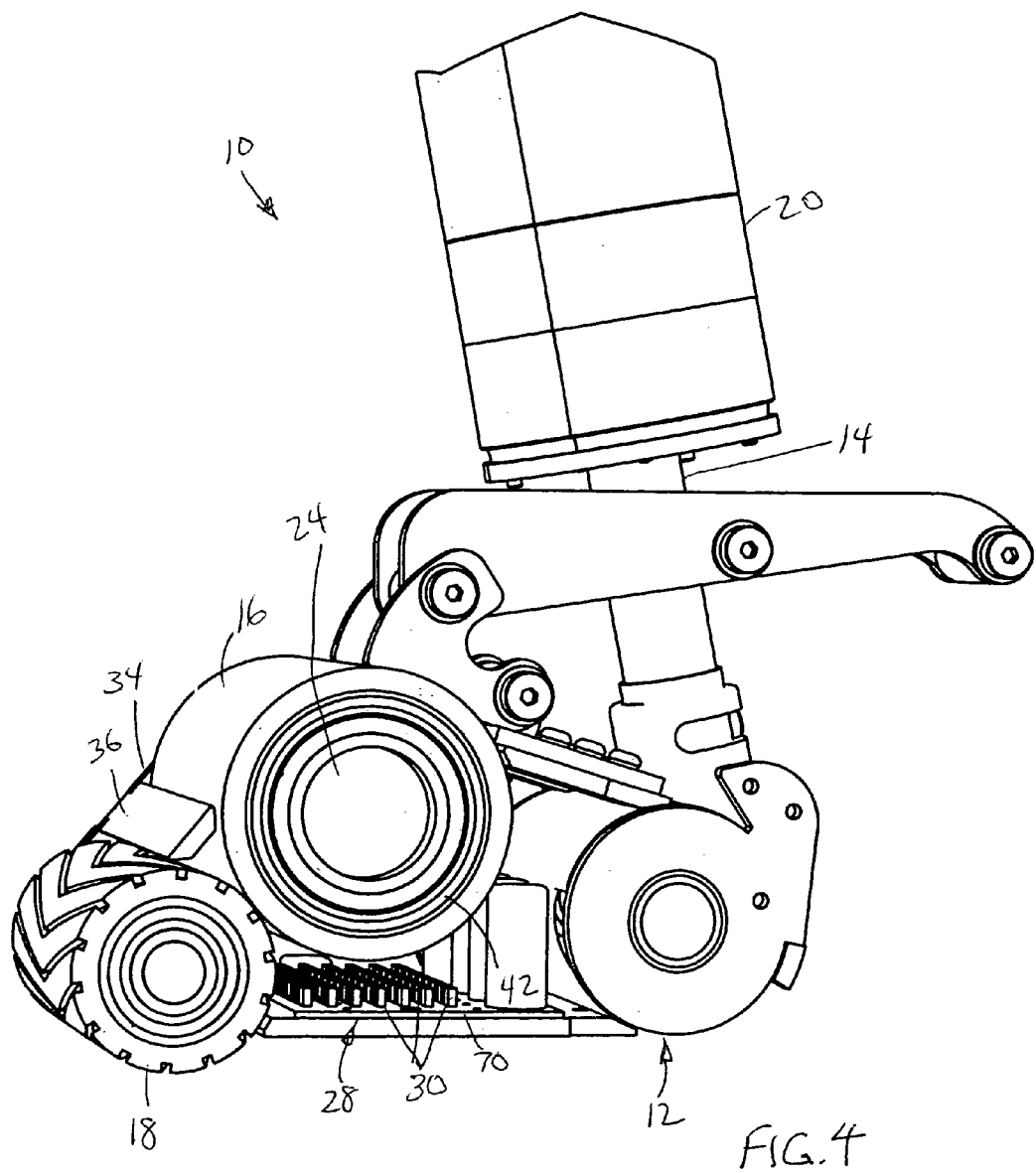
FIG. 4 is another enlarged fragmentary perspective view of the device of FIG. 1 with portions of the device cutaway, removed and cross-sectioned to show the driving unit of the device and also with the handle shaft disposed in a parked position.

Use of a controller 28 having the characteristics of high current reversing pulse width modulated (PWM) variable speed allows an instantaneous 48-volt high current output for high torque (eg for initial overcoming of inertia of a heavy stationary load). A board 70 of the controller 28 is densely populated with the capacitors 30, as seen in FIGS. 2–4, that both store and then can provide instantaneous electrical power (current) to the electric motor 24 as required. The battery packs 20, which discharge power more slowly, then recharge these capacitors 30 for the next use. The use of the controller 28 allows a quick and considerable amount of power, without damaging the battery packs 20 by drawing too much instantaneous current out of them. The controller 28 used is based on a commerically available device known as The Micro II Digital 24-Volt PWM Scooter Controller available from IPC Automation of McHenry, Ill. The controller 28 had to be specially designed, however, to incorporate the following modifications of the cited device: (1) physically shaped to fit inside the frame or chassis 12 of device 10; (2) modified to use newer solid-state and more compact components to reduce it size; (3) designed to operate at 48V (instead of 24V); (4) specified to run at 130 amps max.; and (5) more densely populated with capacitors 30 to provide instantaneous amps without drawing same high amps from the battery packs 20.

Gearbox

A compact, multi-stage planetary gearbox 26 (in this case, approximately 160:1 reduction) takes the 10 krpm speed of the electric motor 24 down to a more conventional running rpm suitable for the materials handling device. The gearbox 26 is designed and mounted to work inline with the electric motor 24, and then the combined motor-gearbox can fit "inside" the drive roller 16, so that the "core" of the device 10 (drive roller 16, electric motor 24 and gearbox 26) reside in a volume of just 4" diameter roller by about 11" wide.

Machine Design

To achieve a very compact design, that is, one that makes the material handling device 10 low enough to fit under most loads and still short and narrow enough to fit into small spaces, other design considerations need to be accommodated. So the following features of the device 10 are relevant:

(1) The electric motor 24 and gearbox 26 are sized to be able to (i) operate in-line (to avoid the additional space consumed by having them on different axes and connected by some other drive means such as belt or chain), and (ii) small enough to be fitted inside the drive roller 16 (the same as the pneumatic motor does in the above-cited pending patent application).

(2) The battery packs 20 are configured to wrap (clamshell) around the handle shaft 14, moving them away from the remainder of the device 10 itself, thus allowing the device 10 to remain small. This also makes the battery packs 20 more accessible (do not have to bend down as far to reach them).

(3) The handle shaft 14 is designed to pivot forward into a park position, that allows the weight of the battery packs 20 to be above the unit, and therefore the device 10 remains weight balanced when parked, and has a very small footprint.

Comparison With Conventional Technology

A comparison between a hypothetical, conventional technology, battery powered conventional device and the battery powered device 10 of the present invention demonstrates that nearly the same total power is available over a given day. The conventional device employed a 12-volt battery (dims and weight) operating a single 12-volt motor running a work gearbox and had one full charging at the end of each shift. The total power available over a day=Voltage (12v)×Current (75% of 105 AmpHrs)×0.75 (deduction for weight of device, 12v motor inefficiencies)=708 units of power over the day. The device 10 of the present invention was equipped as described hereinabove, two 48v battery packs operating a 48v electric motor, and assuming three changes of the double battery pack through each shift (so one battery pack every 2–3 hours with a 1 hour charge time for the packs not on the machine). The total power available over a day=Voltage (48v)×Current (95% of 4.8 AmpHrs)×3 Changes=657 units of power over the day. Based on the foregoing, together with tests confirmed at plant facilities, it has been found that with a few minutes (over a total day) to switch out battery packs, the device 10 of the present invention is capable of matching the performance of significantly larger, heavier and more cumbersome, conventional battery powered device.

Figure 12:
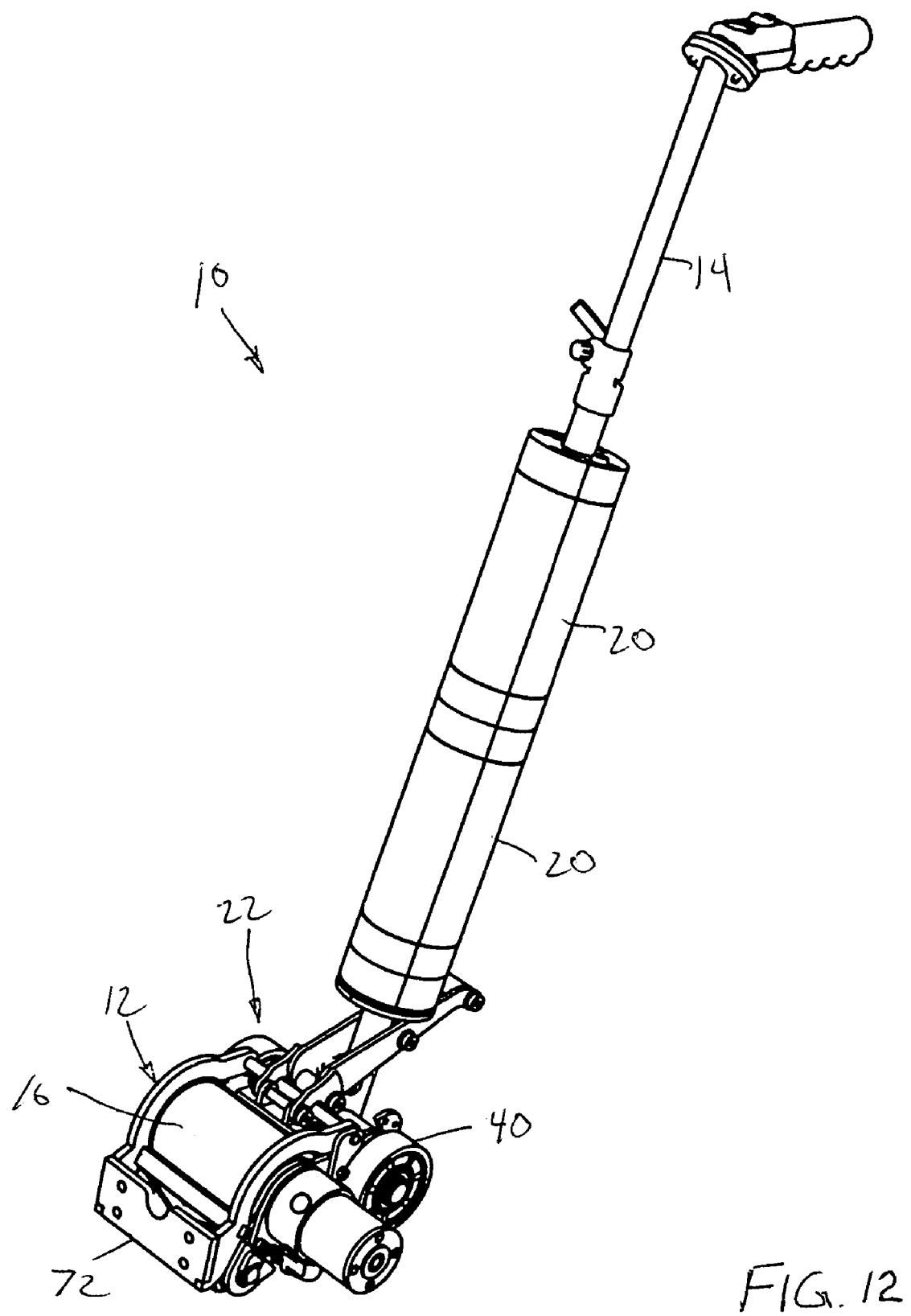
FIGS. 12–14 are perspective views of the device reconfigured to perform a push and/or pull operation.
Figure 13:
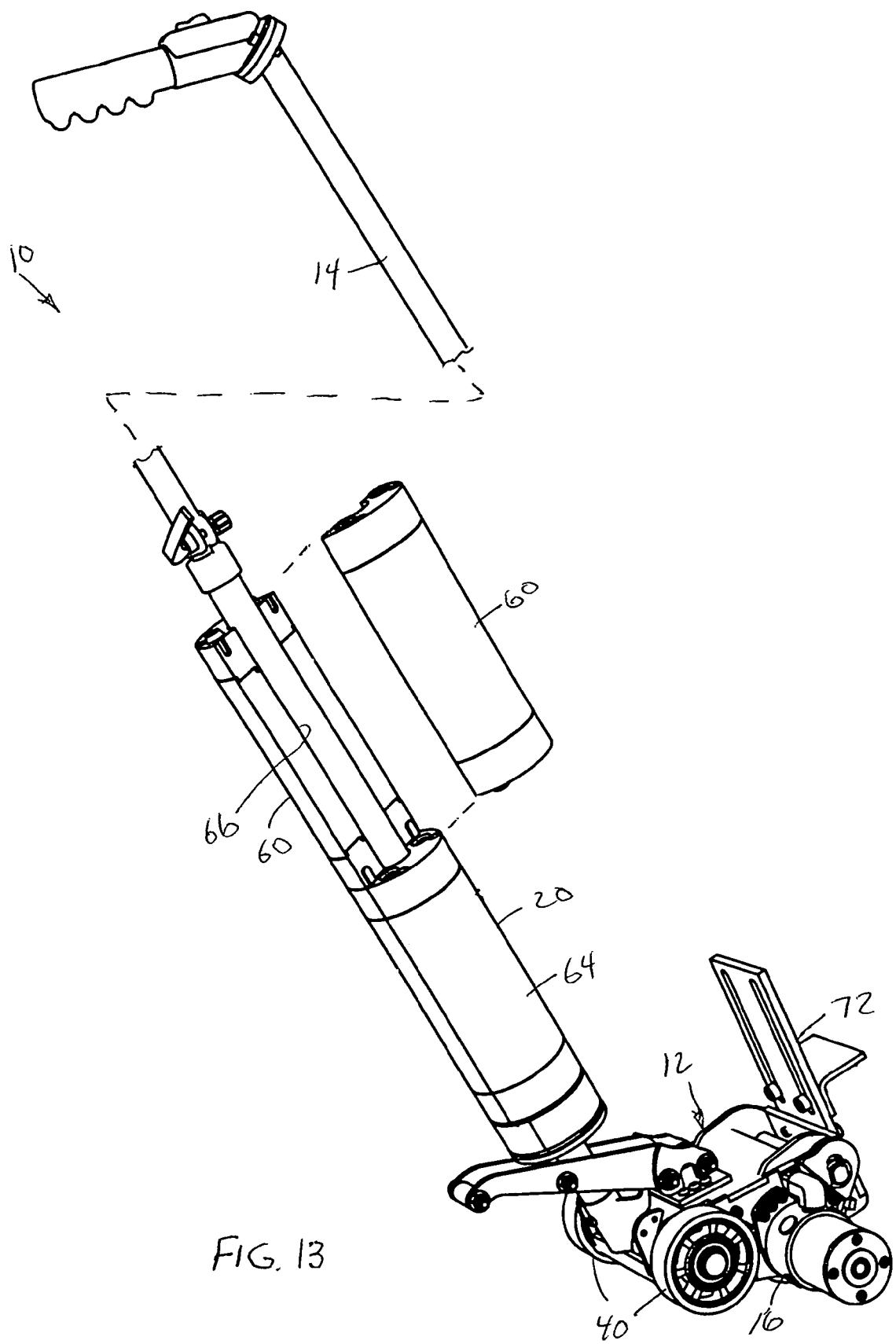
Figure 14:
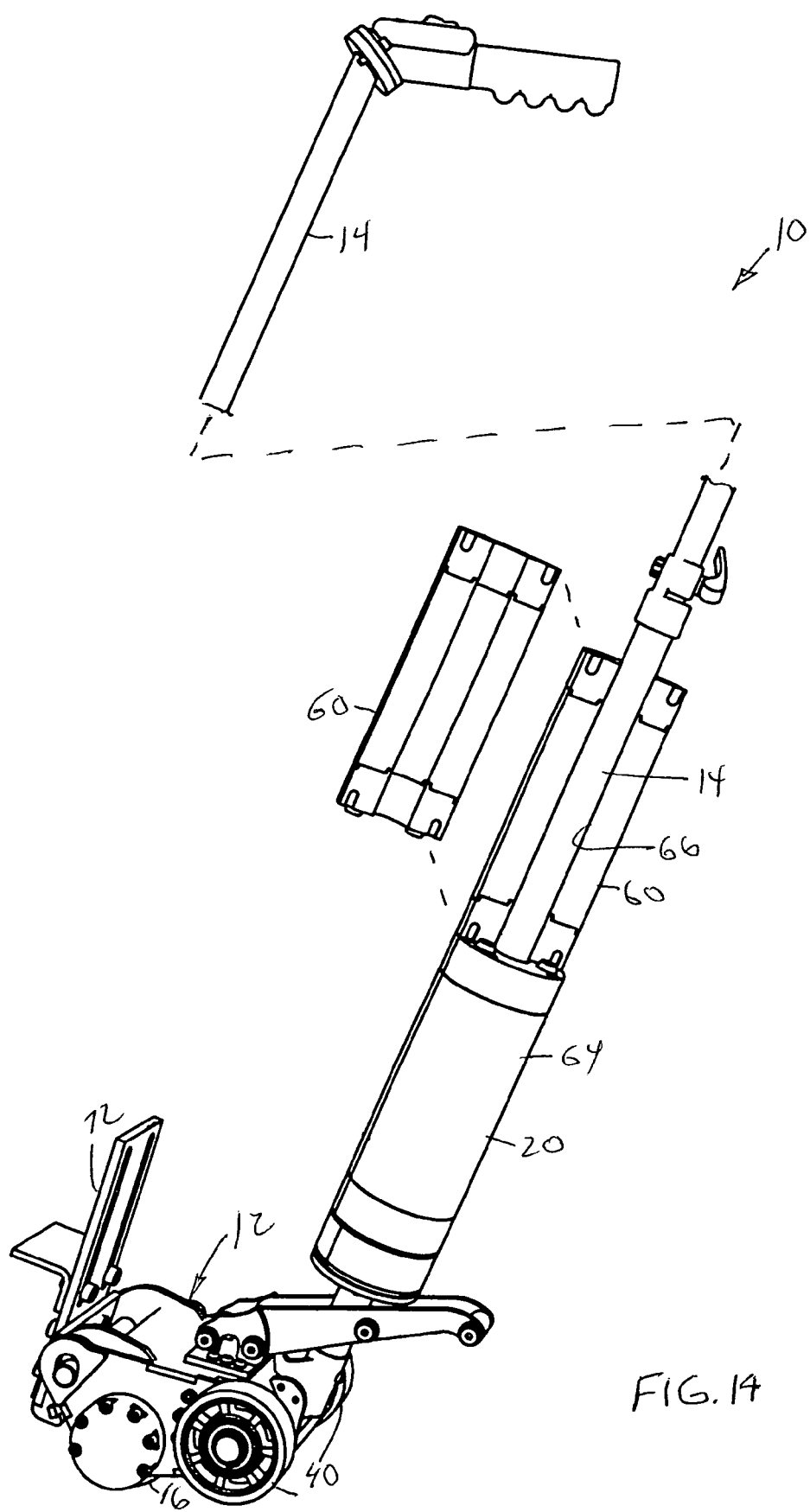
Figure 15:
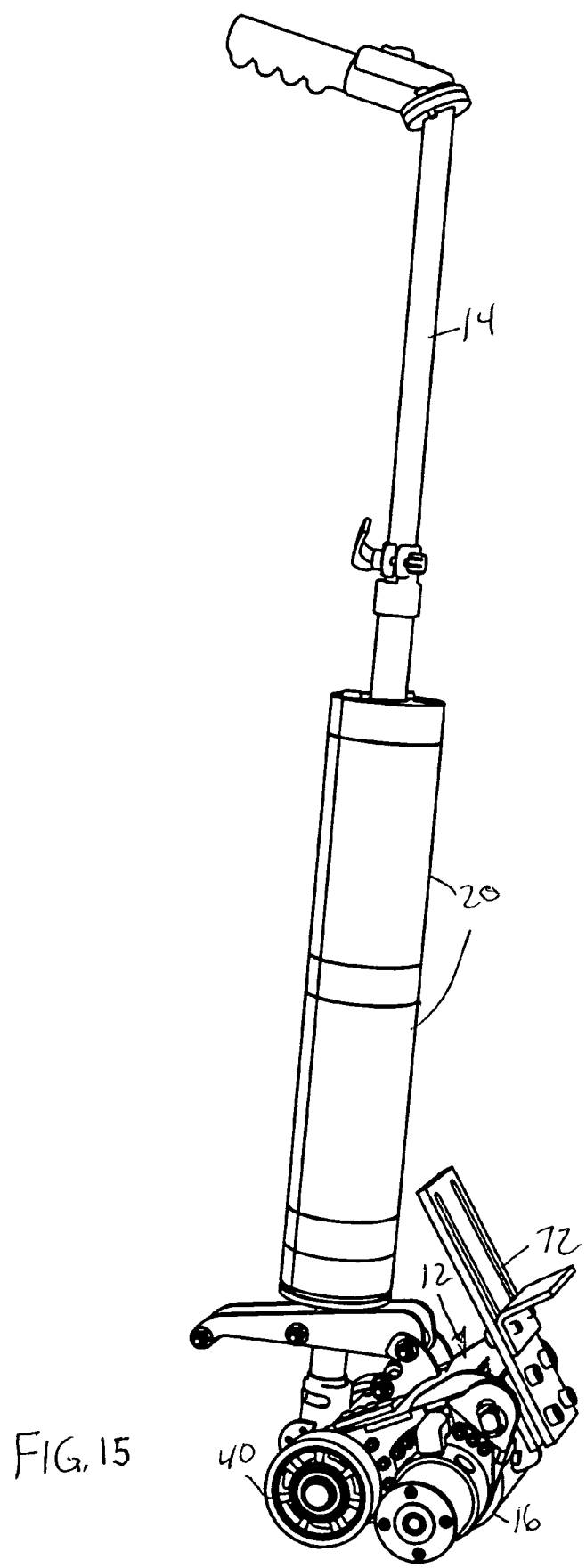
FIG. 15 is a perspective view of the reconfigured device with the handle shaft in the parked position.

FIGS. 12–14 depict the materials handling device 10 being disposed in the operational position and reconfigured to push and/or pull an object rather than rolling it by replacing the one roller with a push/pull fitting 72. In FIG. 15, the reconfigured device 10 is shown with its handle shaft 14 in the parked position.

Figure 16:
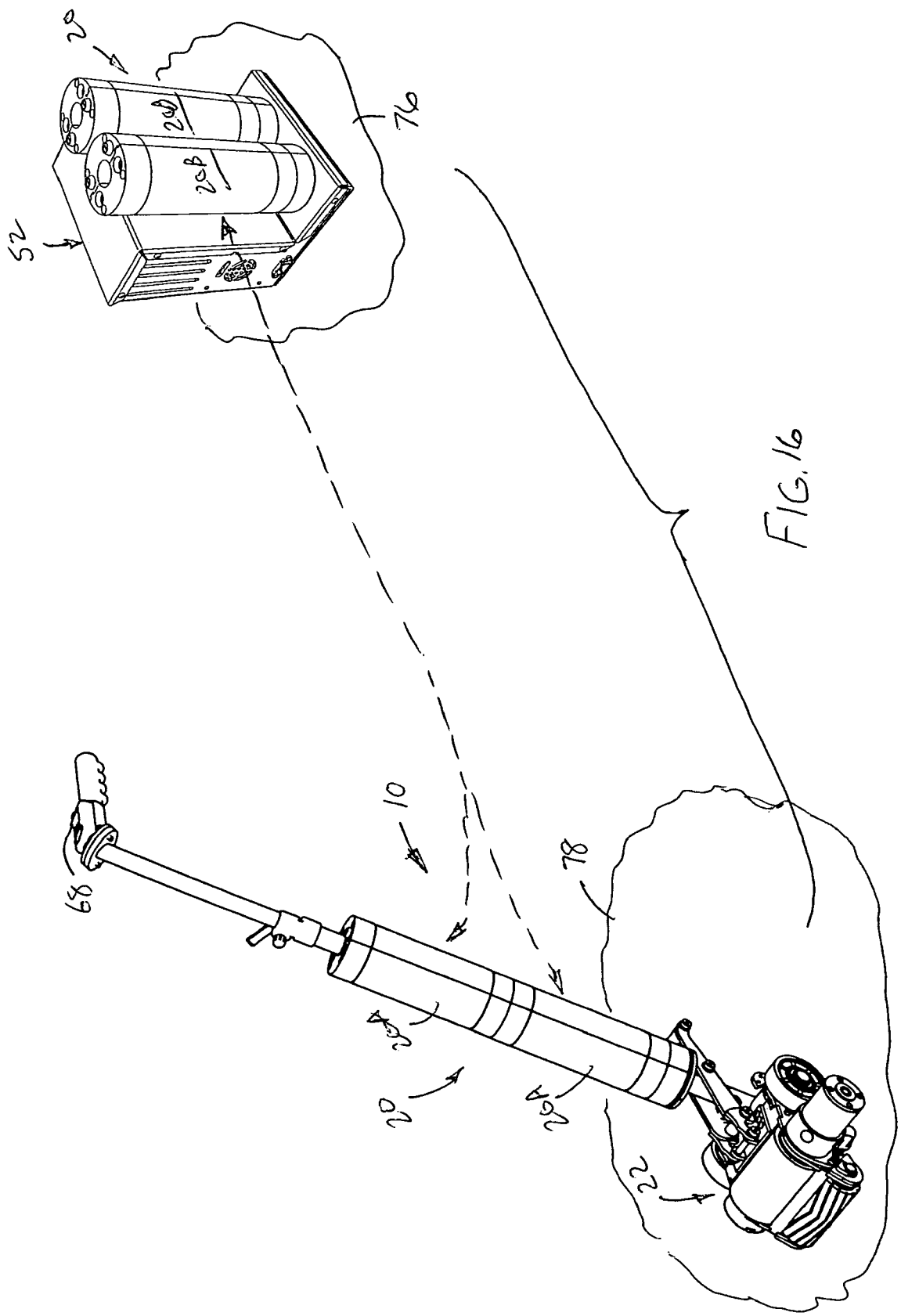
FIG. 16 is a perspective view of a material handling system incorporating the components of the present invention.

Turning now to FIG. 16, there is illustrated one embodiment of a materials handling system, generally designated 74, incorporating the components of the present invention. While the materials handling system 74 is shown incorporating the materials handling device 10 described in detail hereinabove, it should be readily understood that the system 74 within the purview of the present invention may equally apply to and incorporate other conventional materials handling devices, such as those briefly referred to above in the Background Art section of the subject application.

More particularly, the materials handling system 74 includes a battery charger 52 which is not carried by the device 10 but instead is provided at a location 76 which is preferably nearby an area 78 where the materials handling device 10 is being operated to manipulate and move a load. The battery charger 52 is operable to convert or recharge the "off-device" rechargeable battery packs 20 from a discharged condition to a charged condition within a period of time which is usually less than the period of time it takes for the operation of the device 10 to run down the "on-device" battery packs 20. Should that not be the case, additional fully charged battery packs 20 are present near the battery charger 52 in case they are needed during the period of operation of the device 10. Thus the battery charger 52 is conveniently disposed at location 76 nearby but off and away from the device 10 at a stationary position where the battery charger 52 will be out of the way of the device 10 so as not to interfere with the device's area 78 of operation.

As described before, the device 10, which is operable to move a load at the area 78 of operation, basically includes a drive unit 22 provided on the device 10, a plurality of the rechargeable battery packs 20, and a controller 28 provided on the device 10. At least one of the rechargeable battery packs 20A is removably and replaceably provided on the device 10 for supplying electrical power to operate the drive unit 22. At least another of the rechargeable battery packs 20B is provided at the location 76 of the battery charger 52 and maintained in a charged condition by the battery charger 52 so that the another rechargeable battery pack 20B is available to immediately replace the at least one rechargeable battery pack 20A on the device 10 upon the latter reaching the discharged condition. The controller 28 has a plurality of capacitors 30 connected to the at least one rechargeable battery pack 20A on the device 10. The capacitors 30 are charged by the at least one rechargeable battery pack 20A so as to always have available a store of electrical power. The capacitors 30 also are electrically connected between the at least one rechargeable battery pack 20A and the drive unit 22 such that the capacitors can supply the store of electrical power to the drive unit 22 instantaneously when needed such that the drive unit 22 can transmit the necessary high torque driving output to enable the device 10 to thereby move across a surface at the location 78 and to manipulate and move the load. The system 74 further comprises a switch 68 provided on the device 10 and connected to the controller 28. The switch 68 is activatable by an operator to cause the capacitors 30 to discharge and supply instantaneously the store of electrical power to the drive unit 22. The detailed makeup of the battery packs 20 have been described earlier.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

The invention claimed is:

1. A materials handling device, comprising:
   (a) a chassis;
   (b) an elongated handle shaft mounted to said chassis for use in maneuvering said device;
   (c) at least one roller rotationally mounted to said chassis and in contact with a surface;
   (d) at least one battery pack supported on said handle shaft and being configured so as to substantially surround a portion of said handle shaft, said battery pack having a housing which includes a pair of holders being semi-cylindrical in configuration that fit and fasten together to provide said housing with an annular configuration and define a passage through said housing receiving said portion of said handle shaft;
   (e) a drive unit spaced from said battery pack and mounted to said chassis so as to drivingly engage said roller; and
   (f) means for electrically connecting said battery pack to said drive unit to supply electrical power to operate said drive unit to transmit a high torque driving output to said roller so that a rotary driving output can then be supplied by said roller to enable said device to thereby move across the surface and to manipulate and move a heavy load.

2. The device of claim 1 wherein said battery pack includes a plurality of individual battery cells.

3. The device of claim 2 wherein said battery cells are NiCad batteries.

4. The device of claim 2 wherein said battery cells are NiMH batteries.

5. The device of claim 2 wherein said battery cells are Lithium batteries.

6. The device of claim 2 wherein said holders of said housing support said battery cells in stacked end-to-end electrically contacting relationships and have upper and lower electrical contacts electrically contacting end ones of said stacked battery cells.

7. The device of claim 2 wherein said holders of said housing support a plurality of stacks of said battery cells spaced apart from one another about said handle shaft.

8. A materials handling device, comprising:
(a) a chassis;
(b) an elongated handle shaft mounted to said chassis for use in maneuvering said device;
(c) at least one roller rotationally mounted to said chassis and in contact with a surface;
(d) at least one battery pack supported on said handle shaft and being configured so as to substantially surround a portion of said handle shaft, said battery pack including a plurality of individual battery cells, each of said battery cells having about a 1.2 volt rating;
(e) a drive unit spaced from said battery pack and mounted to said chassis so as to drivingly engage said roller; and
(f) means for electrically connecting said battery pack to said drive unit to supply electrical power to operate said drive unit to transmit a high torque driving output to said roller so that a rotary driving output can then be supplied by said roller to enable said device to thereby move across the surface and to manipulate and move a heavy load.

9. The device of claim 8 wherein said battery pack includes forty of said battery cells such that said battery pack has about a 48 volt rating.

10. The system of claim 9 wherein said battery cells are NiCad batteries.

11. The system of claim 9 wherein said battery cells are NiMH batteries.

12. The system of claim 9 wherein said battery cells are Lithium batteries.

13. The system of claim 9 wherein each of said battery packs includes forty of said battery cells such that said battery pack has about a 48 volt rating.

14. A materials handling device, comprising:
(a) a chassis;
(b) at least one rechargeable battery pack removably and replaceably supported on said device, said battery pack including a plurality of individual battery cells and a housing of annular configuration supporting said battery cells in stacked end-to-end electrically contacting relationships and having upper and lower electrical contacts electrically contacting end ones of said stacked battery cells;
(c) an electric motor and gearbox in a driving relation with a roller in contact with a surface;
(d) a controller supported on said chassis and having a plurality of capacitors connected to said battery pack and charged by said battery pack so as to have available a store of electrical power, said capacitors of said controller being electrically connected between said battery pack and said electric motor such that said capacitors of said controller can supply said store of electrical power to said electric motor instantaneously when needed which via said gearbox can transmit a high torque driving output to said roller so that a rotary driving output can then be supplied by said roller to enable said device to thereby move across the surface and to manipulate and move a heavy load; and
(e) an elongated handle shaft mounted to said chassis for use in maneuvering said device, said battery pack being removably and replaceably supported on said handle shaft.

15. The device of claim 14 further comprising:
a switch connected to said controller and being activatable by an operator to cause said capacitors of said controller to discharge and supply instantaneously said store of electrical power to said electric motor.

16. The device of claim 14 wherein said electric motor is about a 48-volt electric motor.

17. The device of claim 14 wherein said battery cells are NiCad batteries.

18. The device of claim 14 wherein said battery cells are NiMH batteries.

19. The device of claim 14 wherein said battery cells are Lithium batteries.

20. The device of claim 14 wherein said housing has a central passage formed therethrough for receiving a portion of said device such that said housing supports a plurality of stacks of said battery cells spaced apart from one another about said portion of said device.

21. The device of claim 20 wherein said housing includes a pair of holders semi-cylindrical in configuration that fit and fasten together to provide said housing with said annular configuration and said passage therethrough.

22. A materials handling device, comprising:
(a) a chassis;
(b) at least one rechargeable battery pack removably and replaceably supported on said device;
(c) an electric motor and gearbox in a driving relation with a roller in contact with a surface;
(d) a controller supported on said chassis and having a plurality of capacitors connected to said battery pack and charged by said battery pack so as to have available a store of electrical power, said capacitors of said controller being electrically connected between said battery pack and said electric motor such that said capacitors of said controller can supply said store of electrical power to said electric motor instantaneously when needed which via said gearbox can transmit a high torque driving output to said roller so that a rotary driving output can then be supplied by said roller to enable said device to thereby move across the surface and to manipulate and move a heavy load; and
(e) an elongated handle shaft mounted to said chassis for use in maneuvering said device, said battery pack being supported on said handle shaft and including a plurality of individual battery cells, each of said battery cells having about a 1.2 volt rating.

23. The device of claim 22 wherein said battery pack includes forty of said battery cells such that said battery pack has about a 48 volt rating.

24. A materials handling system, comprising:
(a) a battery charger disposed at a location nearby an area of operation and operable to convert a rechargeable battery pack from a discharged condition to a charged condition; and
(b) a materials handling device displaced from said battery charger and being operable for moving a load at the area of operation, said materials handling device including
(i) a drive unit provided on the device;
(ii) a plurality of rechargeable battery packs, at least one of said rechargeable battery packs being removably and replaceably provided on said device for supplying electrical power to operate said drive unit, at least another of said rechargeable battery packs being provided at the location of said battery charger and maintained in a charged condition by said battery charger so that said another rechargeable battery pack is available to replace said at least one rechargeable battery pack on said device upon said at least one rechargeable battery pack on said device reaching the discharged condition, each of said battery packs includes a plurality of individual battery cells, each of said battery cells having about a 1.2 volt rating, and (iii) a controller provided on said device and having a plurality of capacitors connected to said at least one rechargeable battery pack on said device, said capacitors being charged by said at least one rechargeable battery pack on said device so as to have available a store of electrical power, said capacitors also being electrically connected between said at least one rechargeable battery pack and said drive unit such that said capacitors can supply said store of electrical power to said drive unit instantaneously when needed such that said drive unit can transmit a high torque driving output to enable said device to thereby move across a surface and to manipulate and move the load.

25. The system of claim 24 further comprising:

a switch provided on said device and connected to said controller and being activatable by an operator to cause said capacitors of said controller to discharge and supply instantaneously said store of electrical power to said drive unit.

26. The system of claim 24 wherein said drive unit includes an electric motor having about a 48-volt rating.

* * * * *